United States Patent

Numata

[11] 4,255,027
[45] Mar. 10, 1981

[54] EXPOSURE CONTROL DEVICE FOR PHOTOGRAPHIC CAMERA

[75] Inventor: Saburo Numata, Urawa, Japan

[73] Assignee: Fuji Photo Optical Co., Ltd., Omiya, Japan

[21] Appl. No.: 33,499

[22] Filed: Apr. 26, 1979

Related U.S. Application Data

[63] Continuation of Ser. No. 690,724, May 27, 1976, abandoned.

[30] Foreign Application Priority Data

May 30, 1975 [JP] Japan .................................. 50-64945

[51] Int. Cl.³ ................................................ G03B 7/093
[52] U.S. Cl. .................................. 354/23 D; 354/24; 354/50; 354/60 R
[58] Field of Search .................. 354/23 D, 24, 50, 51, 354/60 R, 60 A; 340/347; 235/154

[56] References Cited

U.S. PATENT DOCUMENTS

| 3,824,608 | 7/1974 | Toyoda | 354/23 D |
| 3,863,263 | 1/1975 | Itagaki | 354/51 |
| 3,899,788 | 8/1975 | Toyoda | 354/23 D |
| 3,921,183 | 11/1975 | Toyoda | 354/23 D |
| 3,995,284 | 11/1976 | Kitaura | 354/23 D |
| 4,015,275 | 3/1977 | Bletz | 354/24 |

FOREIGN PATENT DOCUMENTS

| 2410959 | 9/1974 | Fed. Rep. of Germany | 354/ |
| 2319167 | 10/1974 | Fed. Rep. of Germany | 354/ |
| 2428927 | 1/1975 | Fed. Rep. of Germany | 354/ |
| 2457306 | 6/1975 | Fed. Rep. of Germany | 354/ |
| 2525857 | 1/1976 | Fed. Rep. of Germany | 352/ |

Primary Examiner—L. T. Hix
Assistant Examiner—Stafford D. Schreyer
Attorney, Agent, or Firm—Fleit & Jacobson

[57] ABSTRACT

In a photographic camera provided with an electric shutter speed control circuit including a light measuring circuit in which scene brightness information is log-compressed and memorized by a memory circuit, the information is log-expanded by use of a decoder. A pulse generator is connected with a flip-flop group so that the pulses from the pulse generator are counted by the flip-flop group. The output of the flip-flop group is log-converted by a decoder connected therewith. The log-converted output of the decoder is compared with the output of the memory circuit by a comparator.

2 Claims, 2 Drawing Figures

EXPOSURE CONTROL DEVICE FOR PHOTOGRAPHIC CAMERA

This is a continuation of application Ser. No. 690,724 filed May 27, 1976 abandoned.

BACKGROUND OF THE INVENTION

1. Field of the Invention

This invention relates to an exposure control device, and more particularly to an electric circuit for controlling exposure time in an automatic exposure control device for a photographic camer in which scene brightness information is converted to exposure time by way of a log conversion diode.

2. Description of the Prior Art

In the conventional analogue type exposure control circuit, scene brightness information from a light measuring circuit is log-compressed and the log-compressed information is log-expanded by use of the diode characteristics of a diode. In the analogue type exposure control circuit, the accuracy is unsatisfactorily low because of fluctuation in the various properties of the circuit elements. In the conventional digital type exposure control circuit, the scene brightness information is memorized after being log-compressed. In this case, the digital value memorized must be once converted to an analogue value before being log-expanded. Further, in the digital type control, the accuracy is markedly lowered when the shutter speed is low. In addition, the digital control circuit employs a considerable number of elements.

SUMMARY OF THE INVENTION

In view of the above described defects inherent in the conventional digital and analogue type exposure control devices, the primary object of the present invention is to provide an exposure control device in which the digital type control and the analogue type control are combined to eliminate the detects of both types, whereby the accuracy of control is enhanced and the structure is simplified.

In the present invention, a decoder is used for log-expansion of the log-compressed information. This invention is applicable to both digital type and analogue type exposure control devices.

DESCRIPTION OF THE PREFERRED EMBODIMENTS

Figure 1:
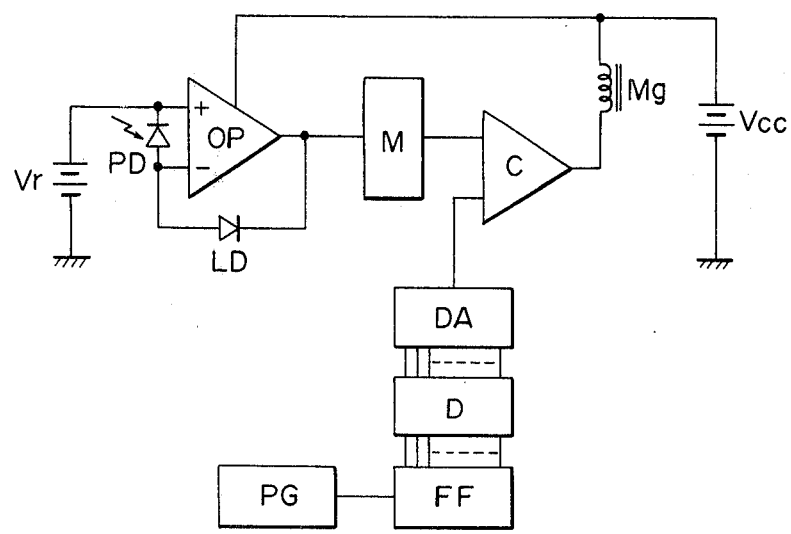
FIG. 1 is a block diagram showing a first embodiment of the present invention applied to an analogue type exposure time control circuit.

Referring to FIG. 1 which shows an analogue type exposure control circuit provided with a decoder in accordance with the present invention, a photodiode PD is connected at its cathode with the positive input terminal of an operational amplifier OP and with a reference voltage source Vr and at its anode with the negative input terminal of the operational amplifier OP and the anode terminal of a log diode LD. The cathode terminal of the log diode LD is connected with the output terminal of the operational amplifier OP. Thus, a light measuring circuit is constituted. A memory circuit M is connected with the output terminal of the operational amplifier OP to memorize the output of the light measuring circuit. A pulse generator PG is connected with a group of flip-flops FF which is connected with a decoder D so that the number of pulses generated by the pulse generator PG is converted to a number of pulses which is a logarithmic equivalent thereof. Thus, the decoder D gives a digital signal the number of pulses of which is a logarithmic function. The decoder D is further connected with a D-A converter DA so that the digital signal from the decoder D is changed to an analogue signal. The analogue signal from the D-A converter DA and the output of the memory circuit M are put into a comparator CO the output terminal of which is connected with a trailing shutter blind starting magnet Mg. The magnet Mg is energized by a power supply Vcc and deenergized when the output of the comparator rises to the level of the power supply Vcc.

In operation of the first embodiment as described hereinabove, the photodiode PD starts to measure the scene brightness when a shutter release button (not shown) is depressed. An electric current of an amount corresponding to the scene brightness flows through the photodiode PD when it is exposed to light from the scene. The current flows through the log diode LD and determines the output voltage of the operational amplifier OP. The output voltage thus determined is memorized by the memory circuit M. The scene brightness measuring step is thus completed. Then, upon further depression of the shutter release button accompanied by the start of a leading shutter blind (not shown), the output of the pulse generator PG is counted by the group of flip-flops FF and the counted output of thereof is log converted by the decoder D. The log converted output from the decoder D is converted to an analogue signal by the D-A converter DA and is compared with the memorized output of the memory circuit M by the comparator CO. When the two outputs become equal, the output of the comparator CO becomes high and the magnet Mg is deenergized. Then, the trailing shutter blind held by the magnet Mg is released to start to terminate the exposure.

Figure 2:
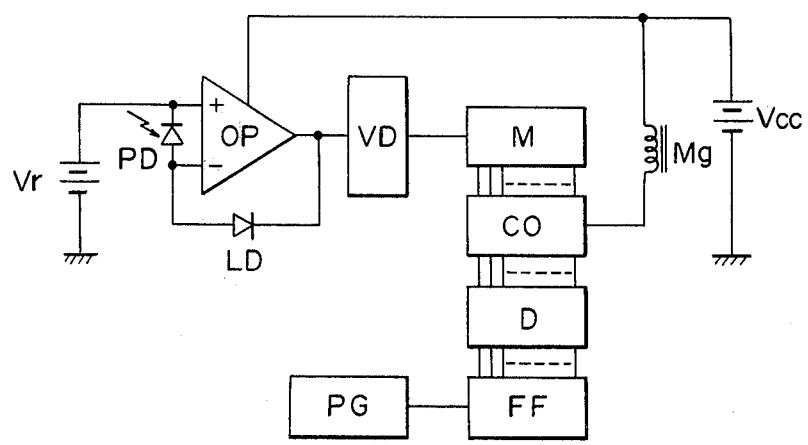
FIG. 2 is a block diagram showing a second embodiment of the present invention applied to a digital type exposure time control circuit.

Referring to FIG. 2 which shows a digital type exposure control circuit provided with a decoder in accordance with the present invention, those elements which are equivalent to the elements shown in FIG. 1 are designated by the same reference characters. In this embodiment, a voltage-digital converter VD is inserted between the output of the operational amplifier OP and the memory circuit M, and a comparator CO is directly connected with the decoder D and the memory circuit M.

In operation of the second embodiment shown in FIG. 2, the output of the operational amplifier OP is converted to a digital value by the voltage-digital converter VD and then memorized by the memory circuit M. The output of the decoder D is in the form of digital pulses and is compared with the output of the memory circuit M which is also in the form of digital pulses. When the number of pulses from the decoder D has become equal to that of the pulses from the memory circuit M, the output of the comparator CO becomes high and the trailing shutter blind starting magnet Mg is deenergized to terminate the exposure.

I claim:

1. An exposure control device for a camera comprising a light measuring circuit for measuring the scene brightness and giving an analogue output indicative of the scene brightness, a voltage-digital converter connected with the light measuring circuit for converting the analogue output voltage of the light measuring circuit to a digital value, a memory circuit connected with the voltage-digital converter for memorizing the digital output thereof, a digital pulse generator for generating digital pulses, a flip-flop circuit means connected with the digital pulse generator for counting the digital pulses therefrom to develop a digital count value, a digital decoder connected with the flip-flop circuit means for log-converting the digital count value from the flip-flop circuit means to derive a log-converted digital output, and a digital comparator connected with said memory circuit and said decoder for comparing the digital output memorized by the memory circuit and the log-converted digital output from the digital decoder so as to generate an output when the level of the log-converted digital output from the digital decoder equals that of the digital output memorized by the memory circuit.

2. An exposure control device as defined in claim 1 wherein said digital comparator is connected with a trailing shutter blind starting magnet for starting a trailing shutter blind of a focal plane shutter when the digital comparator generates its output.

* * * * *